June 17, 1941.                L. L. LEWIS                2,246,370
                             PARTITION JOINT
                           Filed May 10, 1939
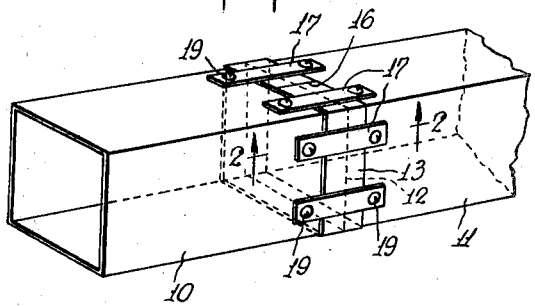
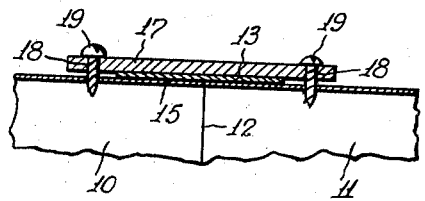
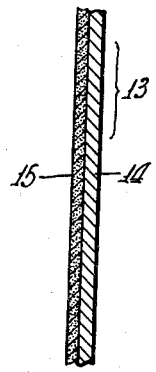
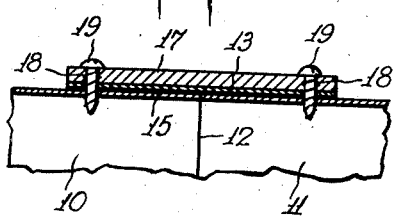
INVENTOR
Leo L. Lewis
BY
ATTORNEY Patented June 17, 1941

2,246,370

UNITED STATES PATENT OFFICE 2,246,370

PARTITION JOINT

Leo L. Lewis, Syracuse, N. Y., assignor to Carrier Corporation, Syracuse, N. Y., a corporation of Delaware Application May 10, 1939, Serial No. 272,825

1 Claim. (Cl. 285—193)

This invention relates to joint construction, and more particularly to joints connecting adjacent walls, panels, partitions, adjacent sections of ductwork and the like.

The general object of the invention is to provide an improved method of and means for joining adjacent partitions, panel or wall sections, and particularly adjacent sections of ductwork or the like, in such manner as to provide a firm, durable and substantially gas-tight connection.

It is another object of the invention to provide an improved method of and means for joining adjacent sections of ducts or the like, in a manner both simple and inexpensive.

It is another object of the invention to provide an improved method of and means for joining adjacent partitions, and particularly duct sections, in such manner that the desired connections may be effected quickly and conveniently, by use of materials which may be handled and applied easily, and without the exercise of any great amount of skill.

It is another object of the invention to provide an air-tight connection for adjacent duct sections or the like, which dispenses with the need for liquid adhesives, felt packings, plastic materials, putty and the like, heretofore used to prevent leakage of air or other gas conveyed through the ducts.

According to the invention, the duct sections or partitions to be joined are arranged so that their edge portions abut one against the other, and a strip of flexible material such as metal, faced with suitable adhesive, is arranged to overlie the fissure or line of jointure between the duct sections. The adhesive-faced strip of metal extends throughout the line of jointure between the duct sections, and may be continuous or may be formed of several consecutive strips, if so desired. Application of slight pressure to the adhesive metal stripping is sufficient to cause this sealing strip to adhere to the surfaces of duct sections which it respectively connects.

One or more relatively heavy, rigid bonds are then arranged to overlie the sealing strip and preferably to extend beyond the edges thereof. Through apertures formed in the bonds, suitable machine screws or the like are inserted and caused to penetrate through the sides of the adjacent duct or partition sections. Tightening of these screws brings the relatively heavy and inflexible bonds into contact with the sealing strip, so that the bonds exert a constant pressure upon the strip to insure adhesion thereof to the sides of the duct sections. The bonds also serve as strong mechanical connections between the adjacent duct sections so that there is no mechanical weakness at the points of jointure apt to cause sagging or the like. Any number of bonds may be used in accordance with the requirements of particular installations.

Other objects, features and advantages of the invention will be more apparent from the following description to be read in connection with the accompanying drawing in which:

Fig. 1 is a view in perspective of a duct having different sections thereof joined in accordance with the invention;

Fig. 2 is a fragmentary sectional view taken on the line 2—2 of Fig. 1;

Fig. 3 is a fragmentary view in section of a sealing strip used in carrying out the invention in a preferred form; and Fig. 4 illustrates a modified form of the invention.

Referring now to the drawing, the numeral 10 designates a duct section which is to be connected to an adjoining duct section 11. The duct sections 10 and 11 are arranged so that the respective side walls thereof are in abutting relation, the line of jointure between the duct sections as thus disposed being designated 12. After the duct sections have been arranged in abutting relationship, a sealing strip 13 is applied to the duct sections in such manner as to overlie the line of jointure 12 and the extreme portions of the duct sections 10 and 11. The sealing strip 13 preferably comprises a strip of relatively thin flexible material, such as metal, indicated at 14 in Fig. 3, the inner surface of the strip being provided with a layer of any suitable adhesive material as indicated at 15. The sealing strip 13 is applied throughout all sections or sides of the ducts so that the line of jointure therebetween is completely covered by the sealing strip. As indicated, a single strip 13 is used, the ends thereof being indicated as in abutting relationship at 16. If desired, of course, the ends of strip 13 could be arranged so as to overlie one another through a short distance. Also, while a single strip has been indicated in the drawing, it will be apparent that the sealing strip 13 might be sectionalized if desired. In connecting ducts of relatively large dimensions, the use of sectionalized sealing strips may be preferred. Due to the pressure-sensitive adhesive inner facing of the sealing strip 13, the strip 13 may be caused to adhere to the duct sections by the application of slight pressure.

After the sealing strip 13 has been applied to the line of jointure, a plurality of relatively heavy, strong and inflexible bonds 17 are arranged to overlie the sealing strip 13. The ends of the bonds 17 preferably extend beyond the edges of the sealing strip 13. Through suitable apertures 18, formed in the extending end portions of the bonds 17, are inserted a plurality of screws or the like 19, which preferably are of the self-threading type. The screws 19 will hold the bonds 17 firmly against the sealing strip 13 which, in turn, is held firmly against the duct sections 10 and 11.

Any number of bonds 17 may be used. These bonds are of sufficient strength and rigidity so that when connected in position, preferably on all sides of the duct, they serve to provide a strong mechanical connection between the duct sections and to prevent sagging of the duct at the joint. Rigidity at the line of jointure, as insured by the provision of bonds 17, is important to prevent separation and sagging of the duct sections at the line of jointure.

The sealing strip 13, being flexible and adhesive, serves to prevent any leakage of air or gas throughout the line of jointure.

In the preferred embodiment of the invention illustrated in Fig. 2, the bolts or screws 19 connect the bond 17 and the duct sections 10 and 11 at points beyond the sides of the strip 13. If desired however, the embodiment of Fig. 4 may be employed, in which case the bolts or screws 19 will extend through the sealing strip 13.

While the invention has been described with particular reference to the connection of duct sections, it will be apparent that it may be utilized to advantage in connecting wall partitions, panels and the like.

Since many changes may be made in the invention without departing from the scope thereof, it is intended that all mattter set forth in the above description, or shown in the accompanying drawing, be regarded as illustrative only and not in a limiting sense.

I claim:

A bonding and sealing means for adjacent duct sections comprising a band of flexible metal and an adhesive material on the inner surface of said band and adhered thereto, and a plurality of clamping strips running cross-wise of said band and fastened to the adjacent duct sections on opposite sides of the line of jointure.

LEO L. LEWIS.